US012226991B2

(12) United States Patent
Bell et al.

(10) Patent No.: US 12,226,991 B2
(45) Date of Patent: Feb. 18, 2025

(54) DISCOLORATION RESISTANT FABRIC

(71) Applicant: SURTECO NORTH AMERICA, INC., Myrtle Beach, SC (US)

(72) Inventors: William Ronald Bell, Ethelsville, AL (US); John R. Coulter, North Huntingdon, PA (US); Marilyn Germano, Ravenna, OH (US)

(73) Assignee: SURTECO NORTH AMERICA, INC., Myrtle Beach, SC (US)

( * ) Notice: Subject to any disclaimer, the term of this patent is extended or adjusted under 35 U.S.C. 154(b) by 512 days.

(21) Appl. No.: 16/967,850

(22) PCT Filed: Feb. 10, 2019

(86) PCT No.: PCT/US2019/017404
§ 371 (c)(1),
(2) Date: Aug. 6, 2020

(87) PCT Pub. No.: WO2019/157412
PCT Pub. Date: Aug. 15, 2019

(65) Prior Publication Data
US 2021/0046728 A1 Feb. 18, 2021

Related U.S. Application Data

(60) Provisional application No. 62/629,380, filed on Feb. 12, 2018.

(51) Int. Cl.
*B32B 5/06* (2006.01)
*A47C 7/02* (2006.01)
(Continued)

(52) U.S. Cl.
CPC ............... *B32B 5/06* (2013.01); *A47C 7/021* (2013.01); *A47C 7/185* (2013.01); *B32B 5/022* (2013.01);
(Continued)

(58) Field of Classification Search
None
See application file for complete search history.

(56) References Cited

U.S. PATENT DOCUMENTS 3,925,528 A * 12/1975 Muller .............. C08J 9/232
264/45.4
3,926,644 A * 12/1975 Kaye .............. C08K 5/375
524/307
(Continued)

FOREIGN PATENT DOCUMENTS

CA 2099104 A1 12/1993
CN 106087441 B * 8/2018
(Continued)

OTHER PUBLICATIONS

ASTM E1428-15a, "Standard Test Method for Evaluating the Performance of Antimicrobials in or on Polymeric Solids Against Staining by *Streptomyce* species (A Pink Stain Organism)", ASTM International, 2015, pp. 1-3.
(Continued)

*Primary Examiner* — Vivian Chen
(74) *Attorney, Agent, or Firm* — Dinsmore & Shohl LLP

(57) ABSTRACT

A vinyl fabric includes a polymeric film supported on a substrate. The polymeric film is provided from a composition that includes one or more chlorinated resins (particularly PVC), at least one polymeric plasticizer, large amounts of $TiO_2$, and at least one antioxidant. The combination of the plasticizer, titania and antioxidant provides the film, and in turn the fabric, with improved resistance to discoloration, particularly pink staining as results from the presence of chromophores produced by *Streptoverticillium reticulum*.

20 Claims, 3 Drawing Sheets

(51) Int. Cl.

| | | |
|---|---|---|
| *A47C 7/18* | (2006.01) | |
| *B32B 5/02* | (2006.01) | |
| *B32B 5/12* | (2006.01) | |
| *B32B 5/18* | (2006.01) | |
| *B32B 5/24* | (2006.01) | |
| *B32B 5/32* | (2006.01) | |
| *B32B 7/12* | (2006.01) | |
| *B32B 27/06* | (2006.01) | |
| *B32B 27/08* | (2006.01) | |
| *B32B 27/12* | (2006.01) | |
| *B32B 27/20* | (2006.01) | |
| *B32B 27/22* | (2006.01) | |
| *B32B 27/30* | (2006.01) | |
| *B32B 27/36* | (2006.01) | |
| *C08K 3/22* | (2006.01) | |
| *C08K 5/00* | (2006.01) | |
| *C08L 27/08* | (2006.01) | |
| *C08L 67/02* | (2006.01) | |
| *C09D 127/06* | (2006.01) | |
| *D06N 3/06* | (2006.01) | |

(52) U.S. Cl.
CPC .............. *B32B 5/024* (2013.01); *B32B 5/12* (2013.01); *B32B 5/18* (2013.01); *B32B 5/245* (2013.01); *B32B 5/32* (2013.01); *B32B 7/12* (2013.01); *B32B 27/065* (2013.01); *B32B 27/08* (2013.01); *B32B 27/12* (2013.01); *B32B 27/22* (2013.01); *B32B 27/36* (2013.01); *C08K 3/22* (2013.01); *C08K 5/0016* (2013.01); *C08K 5/005* (2013.01); *C09D 127/06* (2013.01); *D06N 3/06* (2013.01); *B32B 27/20* (2013.01); *B32B 27/304* (2013.01); *B32B 2250/02* (2013.01); *B32B 2250/03* (2013.01); *B32B 2255/102* (2013.01); *B32B 2255/26* (2013.01); *B32B 2266/0228* (2013.01); *B32B 2266/0235* (2013.01); *B32B 2266/0264* (2013.01); *B32B 2307/402* (2013.01); *B32B 2307/7145* (2013.01); *B32B 2307/718* (2013.01); *B32B 2367/00* (2013.01); *B32B 2601/00* (2013.01); *B32B 2605/12* (2013.01); *C08K 2003/2241* (2013.01); *C08L 27/08* (2013.01); *C08L 67/02* (2013.01)

(56) References Cited

U.S. PATENT DOCUMENTS

| | | | | |
|---|---|---|---|---|
| 4,401,720 A * | 8/1983 | Davis | ................ | C08L 27/06 156/321 |
| 4,418,169 A | 11/1983 | Gibbons, Jr. et al. | | |
| 4,781,976 A * | 11/1988 | Fujita | .................. | B60R 13/02 428/318.6 |
| 5,183,695 A * | 2/1993 | Masuhra | ................ | B32B 5/02 442/221 |
| 5,290,890 A | 3/1994 | Kim et al. | | |
| 5,346,755 A * | 9/1994 | Morse | ................ | B32B 27/22 428/519 |
| 9,816,055 B2 | 11/2017 | Leatham et al. | | |
| 2002/0187341 A1* | 12/2002 | Ko | ................ | C09J 7/245 428/343 |
| 2004/0039106 A1 | 2/2004 | Man et al. | | |
| 2005/0020718 A1* | 1/2005 | Gosse | .............. | C08K 5/0016 523/105 |
| 2005/0049224 A1* | 3/2005 | Gaglani | .............. | A61K 31/325 514/479 |
| 2005/0106967 A1* | 5/2005 | Suzuki | .............. | B32B 27/308 442/87 |
| 2009/0288359 A1* | 11/2009 | Martin, Jr. | ........ | E04F 15/02172 428/297.4 |
| 2011/0021680 A1* | 1/2011 | Colle | .................. | C08K 5/11 560/186 |
| 2012/0095176 A1 | 4/2012 | Hiermeier et al. | | |
| 2012/0177856 A1 | 7/2012 | Hardouin-Duparc et al. | | |
| 2013/0310428 A1* | 11/2013 | Joseph | ................ | A01N 43/80 514/417 |
| 2014/0272266 A1 | 9/2014 | Svilar | | |
| 2016/0281036 A1* | 9/2016 | Laster | .................. | C11D 3/39 |
| 2016/0281037 A1* | 9/2016 | Leatham | ............ | C11D 3/39 |
| 2017/0329061 A1 | 11/2017 | Nakazawa et al. | | |
| 2018/0208753 A1* | 7/2018 | Lau | .................. | B29B 7/88 |
| 2020/0115534 A1* | 4/2020 | Meng | ................ | B29B 7/005 |

FOREIGN PATENT DOCUMENTS

| | | | |
|---|---|---|---|
| EP | 1193051 A2 | | 4/2002 |
| KR | 101863618 B | * | 6/2018 |
| WO | 2012/139520 A1 | | 10/2012 |
| WO | 2017046166 A1 | | 3/2017 |

OTHER PUBLICATIONS

K. Singha, "A Review on Coating & Lamination in Textiles: Processes and Applications", Am. J Poly. Sci., 2012, 2(3): 39-49.

PCT/US2019/017404, "Notification of Transmittal of the International Search Report and the Written Opinion of the International Searching Authority, or the Declaration", dated Apr. 15, 2019, pp. 1-8.

Janice Kleinschmidt, "New thinking about pinking—Marine Fabricator", https://marinefabricatormag.com/2017/09/01/new-thinking-about-pinking/, Sep. 1, 2017, pp. 1-5.

Adeka Corporation, "ADK CIZER Material Safety Data Sheet", prepared Jan. 9, 2008, pp. 1-7.

Ifai, "Beathing the pink stain problem in marine fabrics", Industry News, News, Oct. 20, 2016, p. 1.

BASF, Irganox® 1010 Industrial Coatings Technical Data Sheet [online]. Apr. 1, 2015 [retrieved on Mar. 26, 2019]. Retrieved from the Internet: <URL: https://worldaccount.basf.com/wa/NAFTA-en_US/Catalog/Additives/doc4/BASF/PRD/30546637/.pdf?asset_type=pi/pdf&language=EN&urn=urn:documentum:eCommerce_sol_EU:09007bb2801787fd.pdf>, pp. 1-3.

EP 19 75 0459, Supplementary European Search Report and the European Search Opinion, dated Oct. 22, 2021, 6 pgs.

* cited by examiner

DISCOLORATION RESISTANT FABRIC

CROSS-REFERENCE TO RELATED APPLICATIONS

This application claims priority to international application no. PCT/US2019/017404, filed 10 Feb. 2019, which in turn claims priority to U.S. provisional patent application No. 62/629,380, filed on 12 Feb. 2018, the entireties of which are respectively incorporated herein by reference for all purposes.

BACKGROUND INFORMATION

PVC resin-based (vinyl) fabrics are used in a wide range of applications including, for example, as upholstery fabrics for restaurants, offices and marine vessels.

Vinyl fabrics typically include a PVC resin-containing layer supported on a suitable substrate such as a natural or synthetic cloth. The PVC resin-containing layer can include one or more inorganic fillers, e.g., $TiO_2$, $CaCl_2$, etc.

Products made from only PVC resins tend to be hard and sometimes brittle. Plasticizers can blended with the resins to make resulting products more flexible and softer to the touch. Plasticizers for PVC resins can be small molecules, such as phthalates and terephthalates, or polymers such as polyesters (including those made with adipic acid).

When used in wet, humid, or outdoor applications, vinyl fabrics can from a discoloration problem known as "pink staining" (although the discoloration may be many colors other than or in addition to pink). Pink staining often is most obvious on light colored fabrics, in particular different shades of white.

Pink staining is caused by the bacterium *Streptoverticillium reticulum*, which lives and grows in dark, wet conditions, such as those inside an upholstered item such as on the lower face of an upholstery fabric. The bacteria generate chromophore(s) that cause the discoloration. The discoloration then migrates to the surface where it then becomes visible. Once visible, the discoloration (stain) is notoriously hard to remove.

The marine industry has wrestled with pink staining for decades. It was noted as a problem at least as early as the 1980s, with significant effort to avoid, ameliorate or correct the discoloration problem having been extended ever since. One approach has been to employ a variety of biocides.

Arsenic has been used with some beneficial results, but arsenic is highly toxic to humans and animals. It cannot be used in Europe and is being phased out elsewhere.

Other biocides have not been as effective as desired, with some working only for relatively short periods and others, unfortunately, not at all.

Pink staining remains an ongoing problem even today. Technical solutions that prevent or correct pink staining remain desirable.

SUMMARY

Provided herein are PVC resin-based compositions that can be formed into fabric components which help to protect those fabrics against surface discoloration caused by pink staining. The protection is long-lasting and effective. The strategies of the present invention also can protect surfaces from other kinds of discoloration and problems that result from migration to a fabric surface.

The present invention uses a protection strategy that may provide protection according to two independent mechanisms: (1) an integral barrier within the fabric that acts as a physical barrier to stop otherwise mobile chromophores from migrating from a lower region to the surface where discoloration becomes visible and (2) avoidance of transport mechanisms that allow the chromophores to be mobile in the first instance.

The aforedescribed protection results at least in part from the presence in the PVC resin-based composition of a discoloration inhibiting additive package that includes at least or only three ingredients: a polymeric plasticizer, a larger-than-usual amount of $TiO_2$, and an antioxidant. In combination, these three ingredients are particularly effective at blocking chromophore migration and other staining agents from transferring from one side of a fabric to the other.

In one aspect, the present invention relates to a fabric which includes a substrate and, provided thereon, a polymeric film. The latter includes at least one chlorinated resin, a plasticizing amount (i.e., effective amount) of a polymeric plasticizer, 10 to 30 phr $TiO_2$, and 0.1 to 10 phr antioxidant.

In another aspect is provided an upholstery cushion that includes the aforedescribed fabric covering at least a portion of a three-dimensional core.

In a related aspect is provided the foregoing upholstery cushion having in its interior *Streptoverticillium reticulum* bacteria and chromophore(s) produced thereby, but the outer surface of the fabric component is substantially free of discoloration caused by the presence of those chromophore(s).

In yet another aspect is provided a marine vessel which includes at least one of the aforedescribed fabric and upholstery cushion.

Also provided are methods of making the fabric, upholstery cushion, and marine vessel.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"resin" or "polymer" means the polymerization product of one or more types of monomers and is inclusive of homo-, co-, ter-, tetra-polymers, etc.;

"interpolymer" means a polymer that includes mer units derived from at least two reactants, typically monomers, and is inclusive of copolymers, terpolymers, tetra-polymers, and the like;

"mer" or "mer unit" means that portion of a polymer derived from a single reactant molecule (e.g., ethylene mer has the general formula —$CH_2CH_2$—);

"phthalate" means a salt and/or ester of phthalic acid;

"terephthalate" means a salt and/or ester of terephthalic acid;

"(meth)acrylic" means acrylic or methacrylic;

"pbw" means parts by weight;

"phr" (parts per hundred parts resin) means pbw per 100 pbw resin; and

"substantially free"

in connection with small molecule plasticizers in a polymeric film, means less than 0.1, preferably less than 0.05, phr, and in connection with discoloration, means no noticeable discoloration when viewed under ambient room lighting.

DETAILED DESCRIPTION OF ILLUSTRATIVE EMBODIMENTS

The embodiments described below are not intended to be exhaustive or to limit the invention to the precise forms disclosed. Instead, the embodiments are chosen and described so that those skilled in the art may appreciate and understand the principles and practices of the present invention.

The present invention provides PVC resin-based fabrics that are useful in a wide range of applications, non-liming examples of which include fabric coverings for seating, cushions, pillows, luggage, bags, backpacks, clothing, headgear, wallcoverings, and window treatments. Many embodiments of the fabrics of the present invention are weather resistant and waterproof and thus are useful as upholstery fabric in marine applications such as marine cushions and the like.

Figure 1:
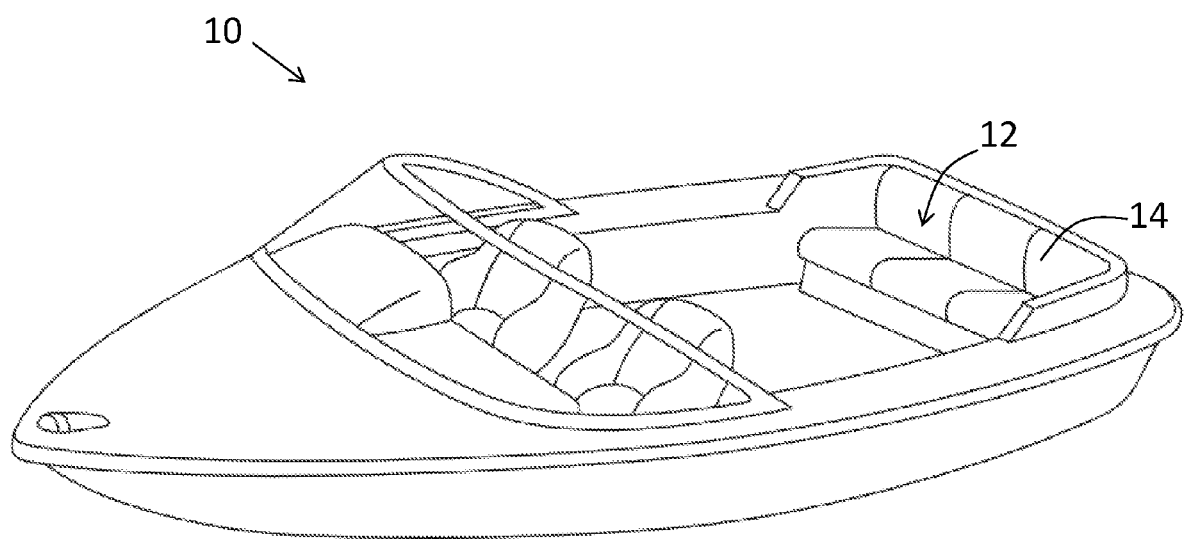
FIG. 1 shows a marine vessel which includes a fabric of the present invention.

FIG. 1 depicts a marine vessel 10 including an upholstery cushion 12 that is covered at least in part by a fabric 14 of the present invention.

Figure 2:
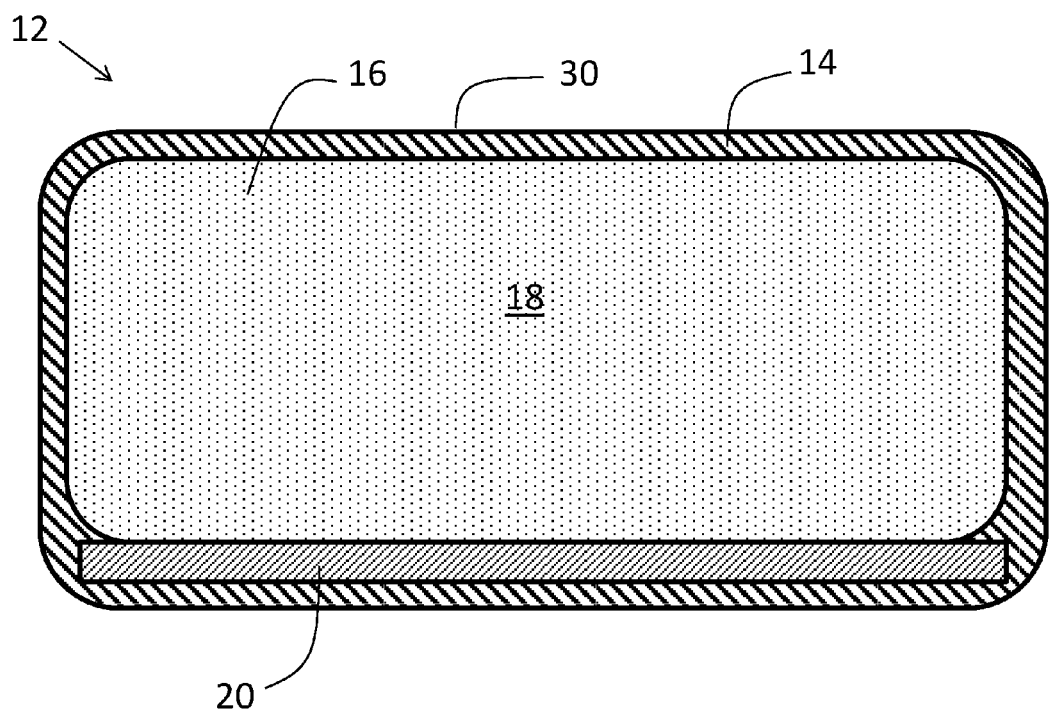
FIG. 2 schematically shows a cross-section of an upholstery cushion incorporating the fabric of the present invention.

As seen in FIG. 2, upholstery cushion 12 includes a three dimensional core 16. Fabric 14, which includes an outer surface 30, covers at least a portion of core 16. Fabric 14 may be affixed to the core 16 using any suitable attachment method(s) including, but not limited to, adhesive or tape, stitching, staples, rivets, snaps, other fasteners, clips, clamps, drawstrings, and combinations of these.

Core 16 often includes a foam body 18 that is resiliently compressible by a user. Cushion 12 optionally can include a rigid backer 20 to help provide structural support when cushion 12 is used as a seat or has an additional function as a lid for a storage compartment or the like. Rigid backers may be made from a wide range of natural and/or synthetic materials such as wood, composite panels such as plywood, polymeric panels, metal plates, etc.

Fabric 14 generally includes substrate 22 and, provided thereon, a polymeric film 24. Substrate 22 serves as a structural backing and reinforcement for fabric 14. Substrate 22 desirably is flexible and possesses sufficient elasticity for the particular end-use application. Where fabric 14 might be exposed to water, high humidity, or other moisture, substrate 22 desirably is hydrophobic, water resistant, and/or waterproof to minimize absorption or other undesirable, water-associated effects.

A wide variety of materials are suitable to form substrate 22. Suitable examples include a wide variety of film-based, woven, or non-woven cloths made from any suitable natural or synthetic material. Woven or nonwoven synthetic cloths are particularly useful when fabric 14 is to be used in marine environments. In one embodiment, a polyester cloth knitted with a circular weave and having a weight of 3 oz./yd.$^2$ was found to be suitable. This cloth may be treated using conventional strategies to improve adhesion of polymeric film 24 to the cloth. Substrate material including filament fibers may be used as an alternative or in combination with spun fibers, but filament fibers have a tendency to provide stiffer fabric embodiments.

The cloth may be treated to help promote adhesion of polymeric film 24 to the cloth. A wide variety of such treatments may be used singly or in combination such etching, exposing to ultraviolet light, exposure to an electron beam, priming with a suitable primer or adhesive, chemically modifying the surface, combinations of these, or the like.

Pink staining tends to originate proximal to substrate 22 because this is where *Streptoverticillium reticulum* bacteria typically live and generate chromophore(s) that cause the discoloration. The present invention advantageously provides an extremely effective way to prevent this discoloration from reaching outer surface 30 of fabric 14. The protection is long-lasting, not consumed by its protective function (as would be true with many biocides), and is integral with fabric 14. The result is that the protection remains in place as fabric 14 is used.

Figure 3:
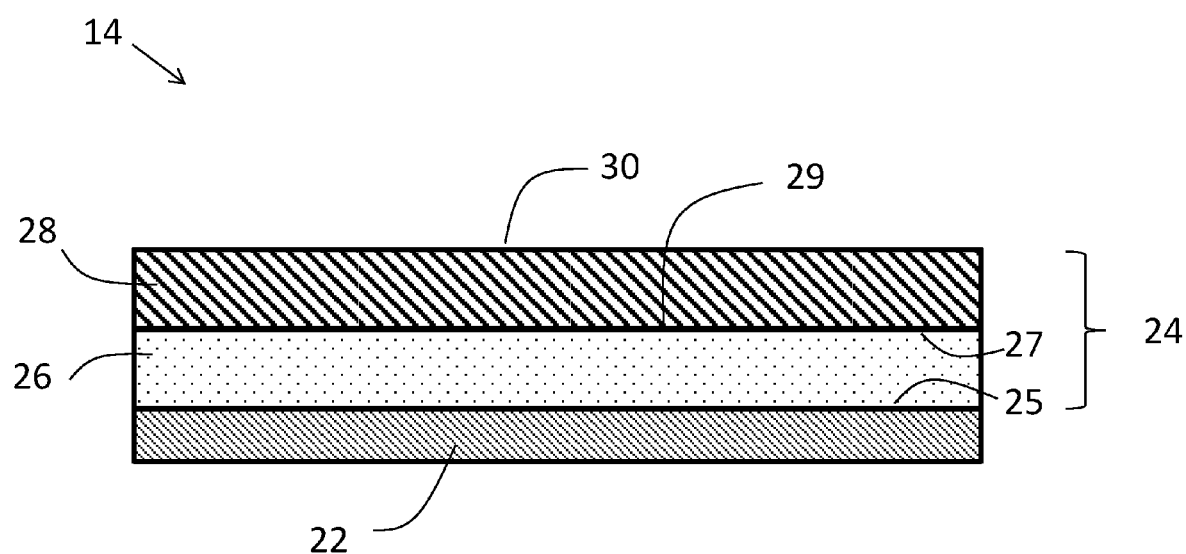
FIG. 3 schematically shows a cross-section of the fabric component of the upholstery cushion from FIG. 2.

Polymeric film 24 can be formed from a single, layer or may be a laminate of two or more layers that are individually formed. Alternatively, polymeric layer can be formed from multiple layers formed in situ. As shown in FIG. 3, polymeric film 24 has a multi-layer structure in which multiple layers are formed in situ during manufacture, described further below.

Polymeric film 24 includes a foamed lower layer 26 and an outer skin layer 28. Setting aside the foamed structure of lower layer 26, the composition of lower layer 26 and outer skin layer 28 may be the same or different.

Foamed lower layer 26 has a lower surface 25 adhered to substrate 22 and an upper surface 27 integrally formed to outer skin layer 28.

Outer skin layer 28 has lower surface 29 integrally formed to lower layer 26 and outer surface 30 generally visible to the user. (Outer surface 30 also is the surface 30 of fabric 14 that a user feels or touches.) As an option, outer surface 30 may include features to provide a desired texture or pattern. Embossing often is a suitable technique to form such a texture or pattern.

Polymeric film 24 includes at least one chlorinated resin deployed in layers 26 and/or 28, preferably both layers 26 and 28. Chlorinated resins help to provide fabric 14 with excellent hand, visual appearance, and durability, particularly in marine environments in which fabric 14 is exposed to solvents, fresh water, salt water, and the like.

Useful resins include at least 10, preferably at least 20, or more preferably at least 50 mer units and up to 100, 500, 1000, or 5000 mer units. The weight average molecular weight ($M_w$) can range from 500 to 200,000, preferably 1000 to 150,000, more preferably 2000 to 100,000 g/mol.

A chlorinated resin refers to a resin derived from one or more reactants, at least one of which is at least includes at least one Cl atom. Optionally, such reactants may be perchlorinated (i.e., all H atoms replaced by Cl atoms). The Cl substituents of the chlorinated reactant(s) may be attached directly to the reactant backbone by a single bond or via a suitable linking group. In some embodiments, chlorinated reactants may be monomeric, oligomeric, and/or polymeric.

The Cl content of the chlorinated resin can vary over a wide range. In many embodiments, it is desirable that a chlorinated resin includes at least ~20%, preferably at least ~40%, and more preferably at least ~60% Cl (all w/w). Perchlorinated embodiments represent a practical upper limit upon Cl content.

Desirably, such chlorinated reactants are free radically polymerizable. Free radical polymerization can occur via a variety of techniques including suspension polymerization, bulk polymerization, emulsion polymerization or solution polymerization.

Examples of free radically polymerizable functionalities include olefinic C—C double bonds, (meth)acrylic groups, allyloxy groups, vinyl groups (e.g., styrenic compounds), cyanate ester groups, vinyl acetate, vinyl ether groups, combinations of these, and the like. Free radically polymerizable functionality is conveniently reacted by exposing the reactants to a suitable source of curing energy, often in the presence of agents (e.g., initiators, etc.) that help promote the desired reaction. The energy source used for achieving polymerization and/or crosslinking of the curable functionality may be actinic (e.g., radiation having a wavelength in the UV or visible region of the spectrum), accelerated particles (e.g., e-beam radiation), thermal (e.g., heat or infrared radiation), or the like.

Illustrative embodiments of free radically polymerizable, chlorinated reactants useful for making chlorinated resins may have structures including 2 to 20, preferably 2 to 10, more preferably 2 to 4 C atoms and at least one C—C double bond. More preferred are partially or fully chlorinated ethenes, chlorinated propenes, and combinations of these, such as monochloroethene (vinyl chloride monomer), 1,2-dichloroethene, 1,1,2-trichloroethene, tetrachloroethene, 1-chloropropene, 2-chloropropene, 1,1-dichloropropene, 2,2-dichloropropene, 1,2-dichloropropene, 1,1,1-trichloro-2-propene, 1,1,2-1-propene, 1,2,3-trichloropropene, combinations of these, and the like.

A preferred class of chlorinated resin is polyvinyl chloride, also referred to herein as PVC polymers or resins. A PVC resin refers to a homo- or interpolymer that includes mer resulting from incorporation of vinyl chloride monomer, $CH_2=CHCl$. PVC resins which include at least 50%, preferably at least 90%, more preferably at least 99%, and most preferably substantially 100% (all w/w) vinyl chloride mer are preferred. A PVC resin formed from only vinyl chloride monomer (except for terminal end groups) is thermoplastic, linear, and very strong.

The PVC resin(s) may be thermoplastic or thermosetting. Thermoplastic PVC resins are preferred for use in the illustrative manufacturing method described below.

Different PVC resins and methods of making PVC resins are widely described in the patent and technical literature; see, e.g., U.S. Pat. Nos. 4,418,169 and 5,290,890; U.S. Pat. Publ. Nos. 2012/0095176 and 2012/0177856. PVC resins are commercially available from a variety of commercial sources. Examples include SG710 resin suspension (Thai Plastic and Chemicals Public Co., Ltd.; Thailand); Formosa F676 and F2110 resins (Formosa Plastics Corp.; Livingston, New Jersey); Oxy Chem Oxyvinyl 500F (OxyVinyls, LP; Dallas, Texas); and Shintech SE1300F (Shintech, Inc.; Houston, Texas).

Polymeric film 24 also includes at least one polymeric plasticizer that is used in an amount effective to improve the flexibility of the polymeric film 24 and corresponding fabric 14. A polymeric plasticizer also may help to provide a softer feel to fabric 14.

As used herein, a plasticizer refers to a compound that increases the flexibility of chlorinated resins, particularly PVC, and a polymeric plasticizer refers to a polymer capable of acting as a plasticizer.

In many embodiments, a suitable polymeric plasticizer meets two criteria: (1) full miscibility with the chlorinated resin(s) (with fully miscibility considered to be the presence of a single phase at 25° C. in a 20 phr composition) and (2) a glass transition temperature ($T_g$) that is lower than the $T_g$ of any of the chlorinated resin(s) in the composition (with $T_g$ being determinable via DSC). Generally, the plasticizer $T_g$ desirably is at least 10°, preferably at least 20°, and more preferably at least 30° C. lower than that of the resin(s) in the composition.

The polymeric plasticizer can have $M_w \geq 1000$, preferably $\geq 2000$, or more preferably $\geq 3000$. The molecular weight can be limited to make it easier to blend or otherwise use the plasticizer to make fabric 14; for example, polymeric plasticizer can have $M_w \leq 150,000$, preferably $\leq 100,000$, or more preferably $\leq 75,000$. (Molecular weight ranges can be provided by combining any of the lower limits with any of the upper limits.)

One class of polymers suitable for use as plasticizers for PVC includes adipic acid polyester polymers. A wide variety of polymeric plasticizers available from many commercial sources, non-limiting examples of which include ELVALOY HP plasticizers (Dow DuPont; Wilmington, Delaware); ADMEX plasticizers Eastman Chemical Company (Kingsport, Tennessee); PALAMOLL plasticizers BASF (Leverkusen, Germany); and the PN series of plasticizers (Adeka; Tokyo, Japan).

The amount of polymeric plasticizer(s) present in polymeric film 24 is effective to help plasticize the PVC resin(s). A wide range of amounts would be suitable depending on the degree of flexibility and softness desired. As illustrative guidelines, the weight ratio (on a solids basis, exclusive of solvent) of chlorinated resin(s) to polymeric plasticizer(s) can range from 1:10 to 10:1, preferably from 1:5 to 5:1, more preferably from 1:2 to 2:1, even more preferably from 3:4 to 4:3, and most 1:1±10%.

Significantly, use of a polymeric plasticizer is one of the features of the present invention that works in combination with other components described herein to help prevent surface discoloration of the fabric 14 associated with *Streptoverticillium reticulum*.

The polymeric plasticizer may help prevent discoloration by one or more possible mechanisms. First, a polymeric plasticizer may be more fixed and less mobile in the resultant film as compared to small molecule plasticizers such as a phthalate; in combination with a high loading of $TiO_2$ and an antioxidant, this immobility appears to help establish a barrier that blocks internal discoloration from reaching outer surface 30 of fabric 14.

Second, and related to the first, the reduced mobility of a polymeric plasticizer might reduce the rate of transport of chromophores produced by *Streptoverticillium reticulum* bacteria from the interior of the upholstery, where the bacteria thrive, to outer surface 30; this is in contrast to the significant mobility of small molecule plasticizers.

Third, the high loading of $TiO_2$ and antioxidant(s) are believed to contribute to the relative immobility of the polymeric plasticizer.

Thus, it is believed that all three components—polymeric plasticizer, the high loading of $TiO_2$, and antioxidant—cooperate to help establish a more effective discoloration barrier and/or to more effectively deny the discoloration a transport mechanism to reach outer surface 30. In certain embodiments, the three ingredients alone (or with minor amounts of other ingredients) constitute a discoloration inhibiting additive package.

The presence of small molecule plasticizers such as phthalates or terephthalates can worsen discoloration problems associated with *Streptoverticillium reticulum* in upholstery fabric 14. However, the combination of the polymeric plasticizer, high loading of $TiO_2$, and antioxidant(s) can help alleviate discoloration even if certain small molecule plasticizers, particularly phthalates or terephthalates, are present, although the best protection against discoloration is achieved if small molecule plasticizers (having a molecular weight under about 750 g/mol, or even under about 500 g/mol) are omitted. Accordingly, polymeric film 24 of the present invention desirably is substantially free of phthalate and/or terephthalates small molecules and/or other plasticizer small molecules Polymeric plasticizer may be uniformly distributed throughout polymeric film 24 such that the composition of polymeric film 24 with respect to the plasticizer is uniform throughout both foamed lower layer 26 and outer skin layer 28.

Alternatively, the polymeric plasticizer may be deployed selectively only in portions of polymeric film 24. For example, in one embodiment, the polymeric plasticizer is selectively incorporated into foamed lower layer 26. In this way, the plasticizer is able to function as a barrier and to block discoloration transport in the region of polymeric film 24 most proximal to the *Streptoverticillium reticulum* causing the discoloration. This selective incorporation avoids using the plasticizer in the outer skin layer 28, which is advantageous because a polymeric plasticizer is a relatively expensive ingredient. If polymeric plasticizer is selectively incorporated into only one or more portions of polymeric film 24, the weight ratio of the plasticizer used is still based on the total amount of PVC resin(s) used throughout polymeric film 24.

The polymeric film 24 further includes $TiO_2$. When used at relatively high loadings and in combination with the polymeric plasticizer(s) and the antioxidant, $TiO_2$ helps to prevent surface discoloration on fabric 14. The $TiO_2$ is believed to help both establish a barrier to block discoloration as well as interrupt transport mechanisms that would otherwise shuttle discoloring chromophores from their bacterial source to the surface.

Any form of titania, including monoclinic, rutile, anatase, and brookite, can be used. A rutile embodiment presently is preferred.

The $TiO_2$ particles may have diameters within a wide range. As general guidelines, the $TiO_2$ particles can have an average diameters in the range from 0.05 to 1.0 μm, preferably 0.1 to 0.5 μm, more preferably 0.1 to 0.3 μm. In one experiment, an average particle size of 0.2 μm was found to be suitable. (Average particle size may be determined according to ISO 13317-3:2001.)

Polymeric film 24 incorporates $TiO_2$ at a weight loading that is higher than is typical in most vinyl upholstery fabrics. As general guidelines, polymeric film 24 includes from ~7 to ~30, preferably from ~10 to ~30, phr $TiO_2$.

Polymeric film 24 also includes one or more antioxidants, which are molecules that inhibit the oxidation of other molecules. Use of an antioxidant with chlorinated resins in upholstery fabric applications because because resins generally are considered to be highly resistant to oxidation. However, antioxidants appear to provide additional functionality in polymeric film 24. When used in combination with the polymeric plasticizer(s) and $TiO_2$, the antioxidant(s) help to prevent surface discoloration of fabric 14.

A wide variety of antioxidant(s) may be used in polymeric film 24. A preferred class of antioxidants is the sterically hindered, hydroxyl functional, aromatic antioxidants. Such antioxidants include at least one hydroxyl group pendant directly or indirectly from an aromatic moiety, wherein at least one, preferably two, substituents are ortho to the pendant hydroxyl group. A phenyl moiety comprising at least one linear or branched $C_1$-$C_{10}$ alkyl group ortho to the OH group of the phenol are preferred. More preferred alkyl moieties include methyl, ethyl, propyl, isopropyl, n-butyl, isobutyl, t-butyl, and the like.

Preferred antioxidants are those having molecular weights of from 500 to 5000 g/mol. Such higher molecular weight antioxidants preferably are branched compounds that include a plurality (e.g., 2-10, often 2-6) of sterically hindered phenol moieties independently attached to a common carbon atom by a single bond or a divalent linking group having up to 5, 10 or even 20 C atoms. In some embodiments, the linking groups may be part of a common ring structure with each other and/or the common carbon atom. Additionally or alternatively, the divalent linking group can include one or more ester linkages.

An illustrative example of a branched compound that includes multiple sterically hindered phenol moieties has the following formula (with "tBu" representing a t-butyl group):

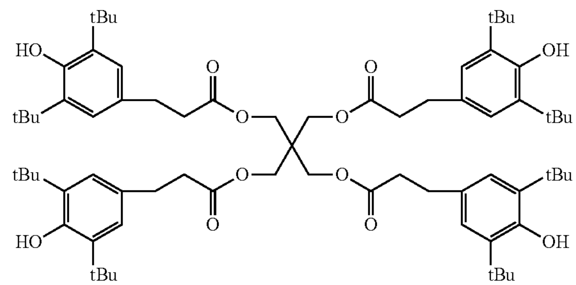 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

The amount of antioxidant(s) used in polymeric film 24 may be selected within a wide range, for example, from 0.1 to 10, preferably 0.5 to 5, phr antioxidant. If too little is used, the ability of the antioxidant to help protect against discoloration may be less than desired. Using too much may be wasteful in the sense of providing little extra protection while potentially risking a reduction in desired performance characteristics.

As an option, polymeric film 24 may include one or more additional ingredients to facilitate manufacture of fabric 14, to help adjust properties of fabric 14, or the like. By way of example, optional ingredients may include one or more of UV stabilizers, coloring aids, lubricants (such as to help prevent sticking of the fabric components to equipment during manufacture and/or to prevent blocking of finished fabric 14), biocides, antistatic agents, inorganic fillers (other than titania), blowing agents (which can be incorporated into a portion of a polymer film precursor during manufacture such as foamed lower layer 26), antifoaming agents (which can be included in other portions such as outer skin layer 28), authentication taggants, other polymers, and the like.

Fabric 14 can be provided in a variety of ways.

A composition that is a precursor of the foamed lower layer 26 (first precursor composition) is applied onto substrate 22. The first precursor composition generally includes a chlorinated resin (e.g., PVC), a polymer plasticizer, $TiO_2$, and an antioxidant as described above. The first precursor composition also may include a blowing agent to help provide the foam structure of lower layer 26, one or more suitable solvents, and/or processing aids to help reduce the tendency of the applied precursor coating to stick to fabrication equipment such as steel rolls on calendaring equipment. An exemplary first precursor composition is provided in Table 1, immediately below.

TABLE 1

Exemplary first precursor composition

| Ingredient | Amount (pbw) |
|---|---|
| SG710 PVC resin suspension | 100.00* |
| ADK CIZER PN-310 adipic acid polyester polymeric plasticizer | 92.00* |
| UV and thermal stabilizers | 2.24 |
| CaCO$_3$ filler | 20.00 |
| blowing agent | 3.94 |
| foam cell adjuster for fine foam | 2.5 |
| powder lubricants | 5.42 |
| TiO$_2$, rutile | 9.00 |
| antioxidant containing four sterically hindered phenol moieties | 2.00 |
| Biocide | 5.00 |

*Includes solvent as supplied by commercial source.

The first precursor composition is cured. Only partial foaming, if any, is allowed to occur at this stage by curing the first precursor layer at a sufficiently low temperature to avoid unduly activating the blowing agent.

Thereafter, a second precursor composition, from which outer skin layer 28 will be formed, is applied on lower layer 26. The second precursor composition generally is similar to the first except that the second need not include blowing agents or associated additives if outer skin layer 28 is not desired to be in the form of a foam. The second precursor composition optionally may include one or more colorants to adjust the color of outer skin layer 28 which, unlike lower layer 26, is visible to the end user. For example, the TiO$_2$ tends to provide a very stark white color to fabric 14, although small amounts of colorants to soften the white (to ivory, eggshell, beige or other more muted colors) or to provide other hues may be used. An exemplary second precursor composition is provided in Table 2, immediately below.

TABLE 2

Exemplary second precursor composition

| Ingredient | Amount (pbw) |
|---|---|
| SG710 PVC resin suspension | 100.00* |
| ADK CIZER PN-310 adipic acid polyester polymeric plasticizer | 96.00* |
| UV and thermal stabilizers | 2.50 |
| CaCO$_3$ filler | 25.00 |
| powder lubricants | 4.25 |
| TiO$_2$, rutile | 25.00 |
| antioxidant containing four sterically hindered phenol moieties | 2.00 |
| colorants | 0.14 |
| biocide | 5.30 |

*Includes solvent as supplied by commercial source.

The second precursor composition then is cured before the entire structure is heated in a foaming oven to activate the blowing agent in the first precursor layer, which causes the first precursor composition to foam and expand, providing an expanded layer (e.g., 55 to 60 mils thickness). If desired, the product can be compressed to a desired final thickness such as, e.g., 40 mils.

The compression may occur with embossing to help provide a desired texture or pattern on the surface.

PVC films have a tendency to be naturally tacky and may have low surface tension. Accordingly, a suitable top finish may be applied onto outer skin layer 28 to provide a desired finish, to seal the surface, and to reduce tackiness. A suitable top finish may be applied at any desired coating weight such as from 7 to 8 g/m$^2$. For a review of coating and lamination techniques used with fabrics, the interested reader is directed to K. Singha, "A Review on Coating & Lamination in Textiles: Processes and Applications," *Am. J. Poly. Sci.*, 2012, 2(3): 39-49.

While various embodiments of the present invention have been provided, they are presented by way of example and not limitation. To the extent feasible, as long as they are not interfering or incompatible, features and embodiments described above in isolation can be combined with other features and embodiments.

The relevant portions of any document specifically referenced in the preceding text or in the examples that follow are incorporated herein by reference.

The following non-limiting, illustrative examples provide the reader with detailed conditions and materials that can be useful in the practice of the present invention.

EXAMPLES

Example 1: Permanent Marker Test

A study was conducted to evaluate the ability different plasticizers to help PVC-based fabric resist discoloration due to chromophores provdued by *Streptoverticillium reticulum*.

A control sample was prepared from a formulation including 100 pbw PVC resin, 88 pbw diisononyl phthalate (DINP) as a monomeric plasticizer, and 27.5 pbw $TiO_2$.

A first embodiment of a PVC resin composition of the present invention was prepared similarly except that 94 pbw adipic acid polyester was used as plasticizer in place of DINP, the amount of $TiO_2$ was increased to 34 pbw, and 1.6 pbw antioxidant with four sterically hindered phenol moieties was included.

A second inventive composition was prepared in an identical manner except that a different type of $TiO_2$ was used.

Using black, blue, and red permanent markers, color stripes were applied to the front side of each of the samples.

The marked samples were held for 2 hours in an oven set at 180° F.

Upon removal, the samples were examined for color transfer to the back side. The control sample showed a high degree of color transfer through the sample; all three colors were easily visible from the back side. No color transfer was visible with respect to the other two samples.

Example 2: Bacterial Chromophore Testing

ASTM 1428-15a describes a test titled "Standard Test Method for Evaluating the Performance of Antimicrobials in or on Polymeric Solids Against Staining by *Streptomyces* species (A Pink Stain Organism)," designed to determine the effectiveness of antimicrobials in vinyl fabrics.

Using the same formulations provided above in Example 1, additional samples were prepared to evaluate resistance to discoloration resulting from *Streptoverticillium reticulum*-origin chromophores.

While commercial embodiments of the finished product are expected to include one or antimicrobial(s) so as to inhibit microbial growth, samples without any antimicrobials were prepared to determine the ability to prevent staining. (Pink staining often occurs even when antimicrobials are present, which further reflects the need for a solution to the staining issue.)

The bacterium was inoculated onto an agar surface with a nutrient rich growth medium using the parallel streak method.

Each sample was marked on one side with an ink pen identifier, with that same area then being coated with a portion of the bacterial challenge material. Each sample was exposed to the organism for 14 days, after which each sample was evaluated for color transfer of the discoloring chromophore(s). Discoloration was observed on all the samples on the side coated with challenge material, which confirms production of the discoloring chromophore(s).

Resistance to color transfer from the agar side to the other side was quite different for the samples, however.

Both the ink pen and the chromophore-induced discoloration transferred through the control sample and were readily observable on the opposite side.

For the two inventive samples, however, no color transfer of the discoloration or the ink pen was seen.

That which is claimed is:

1. A fabric, comprising:
   a) a substrate comprising a film-based, woven, or non-woven cloth, the substrate comprising a first surface and a second surface; and
   b) provided on the first surface of said substrate, a polymeric film effective to help prevent discoloration resulting from migration and transportation of at least one chromophore produced by the *Streptoverticillium reticulum* bacteria, wherein the polymeric film comprises:
      1) at least one polyvinyl chloride resin;
      2) at least one adipic acid polyester polymeric plasticizer effective to help plasticize the at least one polyvinyl chloride resin, wherein said at least one adipic acid polyester polymeric plasticizer comprises a polymeric plasticizer that has a weight average molecular weight from 1,000 to 75,000 g/mol, wherein a weight ratio of polyvinyl chloride resin to polymeric plasticizer is from 3:4 to 4:3;
      3) 10 to 30 parts by weight $TiO_2$ per 100 parts by weight of the at least one polyvinyl chloride resin, wherein the $TiO_2$ has a particle size of about 0.5 to about 1.0 microns; and
      4) 5 to 5 parts by weight of one or more sterically hindered, hydroxyl functional, aromatic antioxidants per 100 parts by weight of the at least one polyvinyl chloride resin, wherein the one or more sterically hindered, hydroxyl functional, aromatic antioxidants each comprise from 2-10 sterically hindered phenol groups, each sterically hindered phenol group comprising at least two tBu groups, and
      wherein the film comprises from 38 wt. % to 44 wt. % of the polyvinyl chloride resin.

2. The fabric of claim 1, wherein the at least one adipic acid polyester polymeric plasticizer, the $TiO_2$, and the one or more antioxidants are constituents of a discoloration inhibiting additive package with respect to discoloration resulting from at least one chromophore produced by the *Streptoverticillium reticulum* bacteria, and wherein the discoloration inhibiting additive package consists essentially of the at least one polymeric plasticizer, the $TiO_2$, and the one or more antioxidants, wherein the $TiO_2$ is produced by a rutile process.

3. The fabric of claim 1 wherein the polyvinyl chloride resin is thermoplastic.

4. The fabric of claim 1 wherein said polymeric film comprises first and second film layers, said first film layer contacting said substrate and said second film layer overlaying said first film layer, the at least one polyvinyl chloride resin, the TiO2, and the one or more antioxidants are included in each of the first and second film layers, and wherein at least said first film layer further comprises the at least one adipic acid polyester polymeric plasticizer.

5. The fabric of claim 1 wherein said at least one adipic acid polyester polymeric plasticizer comprises an adipic acid polyester polymeric plasticizer that has a glass transition temperature that is at least 30° C. lower than the glass transition temperature of each of said at least one polyvinyl chloride resin.

6. The fabric of claim 1 wherein said polymeric film is substantially free of phthalates and terephthalates.

7. The fabric of claim 1 wherein said polymeric film comprises a foamed lower layer and an outer skin layer, said at least one adipic acid polyester polymeric plasticizer being present only in said lower layer.

8. The fabric of claim 1 wherein said one or more antioxidants comprises an antioxidant that has a molecular weight of from 500 to 5000 g/mol.

9. The fabric of claim 1 wherein the one or more sterically hindered, hydroxyl functional, aromatic antioxidants comprise a sterically hindered, hydroxyl functional, aromatic antioxidant that has the formula

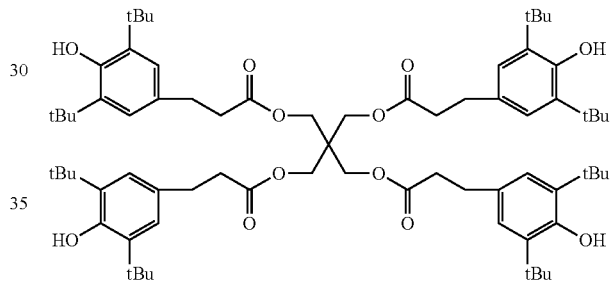

where tBu represents a t-butyl group.

10. The fabric of claim 1, wherein the polymeric film comprises at least 84 wt. % of the combined weight of the at least one polyvinyl chloride resin, the adipic acid polyester polymeric plasticizer, the $TiO_2$, and the one or more sterically hindered, hydroxyl functional, aromatic antioxidants, on the basis of the total weight of the polymeric film.

11. The fabric of claim 1, wherein the polymeric plasticizer has a weight average molecular weight of from 1000 to 30,000 g/mol.

12. The fabric of claim 1, wherein the polymeric film consists essentially of the at least one polyvinyl chloride resin, the adipic acid polyester polymeric plasticizer, the $TiO_2$, and the one or more sterically hindered, hydroxyl functional, aromatic antioxidants.

13. An upholstery cushion, comprising
   a) a three-dimensional core; and
   b) a fabric that comprises:
      1) A substrate comprising a film-based, woven, or non-woven cloth, the substrate comprising first surface and a second surface, and
      2) Provided on the first surface of said substrate, a polymeric film effective to help prevent discoloration resulting from migration and transportation of at least one chromophore produced by the *Streptoverticillium reticulum* bacteria, wherein the polymeric film comprises (A) at least one polyvinyl chloride resin;
(B) at least one adipic acid polyester polymeric plasticizer effective to help plasticize the at least one polyvinyl chloride resin, wherein said at least one adipic acid polyester polymeric plasticizer comprises a polymeric plasticizer that has a weight average molecular weight from 1,000 to 75,000 g/mol, wherein a weight ratio of polyvinyl chloride resin to polymeric plasticizer is from 3:4 to 4:3;
(C) 10 to 30 parts by weight $TiO_2$ per 100 parts by weight of the at least one polyvinyl chloride resin, wherein the $TiO_2$ has a particle size of about 0.5 to about 1.0 microns; and
(D) 0.5 to 5 parts by weight of one or more sterically hindered, hydroxyl functional, aromatic antioxidants per 100 parts by weight of the at least one polyvinyl chloride resin, wherein the one or more sterically hindered, hydroxyl functional, aromatic antioxidants each comprise from 2-10 sterically hindered phenol groups, each sterically hindered phenol group comprising at least two tBu groups, and
wherein the film comprises from 38 wt. % to 44 wt. % of the polyvinyl chloride resin.

14. The upholstery cushion of claim 13 further comprising discoloration resulting from at least one chromophore produced by the *Streptoverticillium reticulum* bacteria in the interior of said cushion, wherein an outer surface of said upholstery cushion is substantially free of said discoloration.

15. The upholstery cushion of claim 13, wherein the at least one polymeric plasticizer, the $TiO_2$, and the one or more antioxidants are constituents of a discoloration inhibiting additive package with respect to discoloration resulting from at least one chromophore produced by the *Streptoverticillium reticulum* bacteria, and wherein the discoloration inhibiting additive package consists essentially of the at least one polymeric plasticizer, the $TiO_2$, and the one or more antioxidants, wherein the $TiO_2$ is produced by a rutile process.

16. The upholstery cushion of claim 15 further comprising discoloration resulting from at least one chromophore produced by the *Streptoverticillium reticulum* bacteria in the interior of said cushion, wherein an outer surface of said upholstery cushion is substantially free of said discoloration.

17. A method of making a fabric, said method comprising forming on a first surface of a substrate comprising a film-based, woven, or non-woven cloth, a polymeric film effective to help prevent discoloration resulting from migration and transportation of at least one chromophore produced by the *Streptoverticillium reticulum* bacteria, wherein the substrate comprises a film-based, woven, or non-woven cloth, wherein the polymeric film is formed from a first precursor composition that comprises:
at least one polyvinyl chloride resin;
at least one adipic acid polyester polymeric plasticizer effective to help plasticize the at least one polyvinyl chloride resin, wherein:
the at least one adipic acid polymeric polymeric plasticizer comprises a polymeric plasticizer that has a weight average molecular weight from 1,000 to 75,000 g/mol and
a weight ratio of polyvinyl chloride resin to polymeric plasticizer is from 3:4 to 4:3;
10 to 30 parts by weight $TiO_2$ per 100 parts by weight of the at least one chlorinated resin, wherein the $TiO_2$ has a particle size of about 0.5 to about 1.0 microns; and
0.5 to 5 parts by weight of one or more sterically hindered, hydroxyl functional, aromatic antioxidants per 100 parts by weight of the at least one polyvinyl chloride resin, wherein the one or more sterically hindered, hydroxyl functional, aromatic antioxidants each comprise from 2-10 sterically hindered phenol groups, each sterically hindered phenol group comprising at least two tBu groups, and wherein the film comprises at least from 38 wt. % to 44 wt. % of the polyvinyl chloride resin.

18. The method of claim 17 wherein the polymeric film formation involves formation of first and second film layers,
said first layer contacting said substrate and being provided from the first precursor composition to form a first polymeric film layer on the substrate;
said second layer overlaying said first layer and being provided from a second precursor composition, wherein said second precursor composition comprises:
the at least one polyvinyl chloride resin,
10 to 30 parts by weight of the $TiO_2$ per 100 parts by weight of the at least one polyvinyl chloride resin incorporated into the second precursor composition, and
0.1 to 10 parts by weight of the one or more antioxidants per 100 parts by weight of the at least one chlorinated polyvinyl chloride resin incorporated into the second precursor composition.

19. The method of claim 18 wherein said first precursor composition further comprises a blowing agent.

20. The method of claim 19, wherein the method further heating said first and second layers in a manner effective to foam and expand the first polymeric film layer.

* * * * *

UNITED STATES PATENT AND TRADEMARK OFFICE
CERTIFICATE OF CORRECTION

PATENT NO. : 12,226,991 B2
APPLICATION NO. : 16/967850
DATED : February 18, 2025
INVENTOR(S) : William Ronald Bell, John R. Coulter and Marilyn Germano It is certified that error appears in the above-identified patent and that said Letters Patent is hereby corrected as shown below:

In the Specification

In Column 7, Line(s) 3, after "molecules", insert --.--.

In the Claims

In Column 11, Line(s) 63, Claim 3, after "claim 1", insert --,--.

In Column 11, Line(s) 65, Claim 4, after "claim 1", insert --,--.

In Column 12, Line(s) 6, Claim 5, after "claim 1", insert --,--.

In Column 12, Line(s) 12, Claim 6, after "claim 1", insert --,--.

In Column 12, Line(s) 14, Claim 7, after "claim 1", insert --,--.

In Column 12, Line(s) 18, Claim 8, after "claim 1", insert --,--.

In Column 12, Line(s) 21, Claim 9, after "claim 1", insert --,--.

In Column 13, Line(s) 24, Claim 14, after "claim 13", insert --,--.

In Column 13, Line(s) 39, Claim 16, after "claim 15", insert --,--.

In Column 14, Line(s) 8, Claim 17, delete "polymeric polymeric" and insert --polymeric--, therefor.

In Column 14, Line(s) 27, Claim 18, after "claim 17", insert --,--.

In Column 14, Line(s) 44, Claim 19, after "claim 18", insert --,--.

Signed and Sealed this
Seventeenth Day of June, 2025

Coke Morgan Stewart
*Acting Director of the United States Patent and Trademark Office*